Feb. 19, 1924.  
O. E. SCHNOEBELEN  
1,483,954  
TRANSMISSION BAND ADJUSTER  
Filed July 6, 1922

Inventor  
Oscar E. Schnoebelen  
By Horace C. Sander  
Attorney

Patented Feb. 19, 1924.

1,483,954

UNITED STATES PATENT OFFICE.

OSCAR E. SCHNOEBELEN, OF LEETONIA, OHIO.

TRANSMISSION-BAND ADJUSTER.

Application filed July 6, 1922. Serial No. 573,077.

*To all whom it may concern:*

Be it known that I, OSCAR E. SCHNOEBELEN, a citizen of the United States, residing at Leetonia, in the county of Columbiana, State of Ohio, have invented certain new and useful Improvements in Transmission-Band Adjusters; and I do hereby declare the following to be a full, clear, and exact description of the invention, such as will enable others skilled in the art to which it appertains to make and use the same.

This invention relates to new and useful improvements in automobile devices, and particularly to devices for adjusting the transmission bands, to compensate for the wear thereof.

The principal object of the invention is to provide means for adjusting the brake or transmission bands, without removing the cover or hand-hole plate of the transmission housing, or the housing thereof, and also prevents loss of nuts and washers while adjustments are being made.

Another object is to provide novel and improved means for maintaining the pedal shaft against rotation, when the pedal is moved thereon.

Other objects and advantages will be apparent from the following description when taken in connection with the accompanying drawing.

Figure 1:
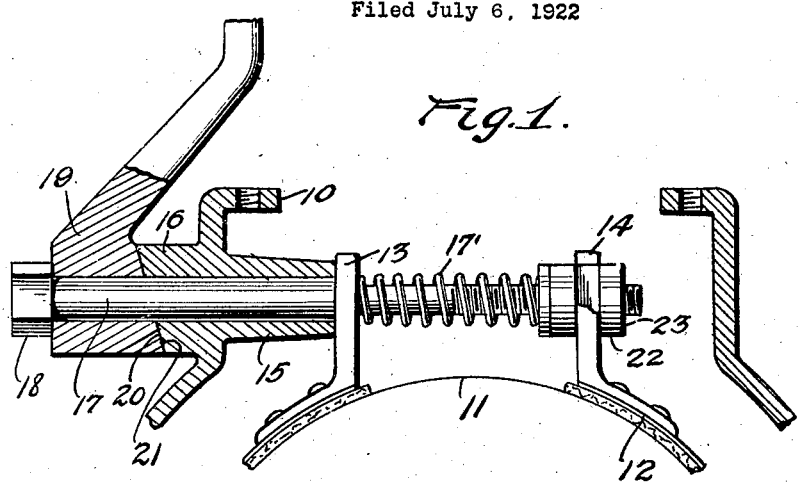
Figure 1 is a sectional view through the casing of a transmission mechanism, showing the invention applied thereto.
Figure 2:
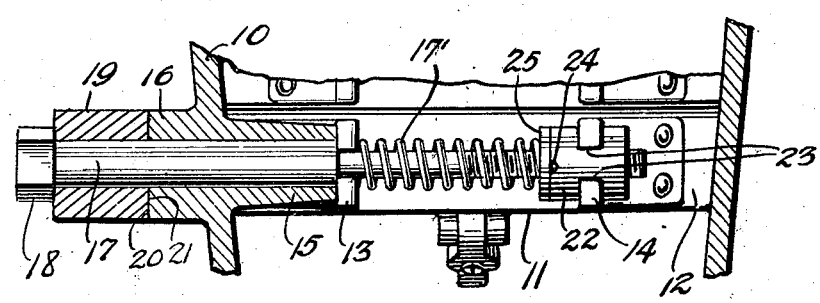
Figure 2 is a top plan view of the same.
Figure 3:
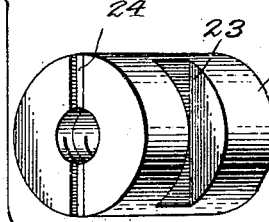
Figure 3 is an enlarged perspective view of the retaining nut, removed from the lug of the transmission band.
Figure 4:
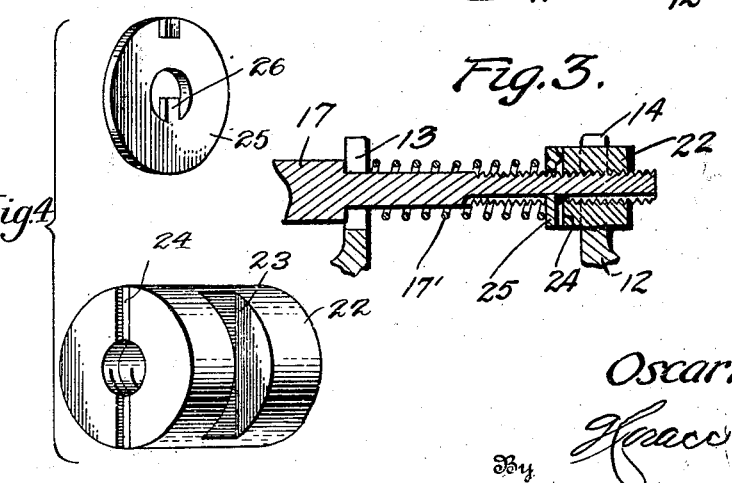
Figure 4 shows a perspective view of the washer and the nut.

Referring particularly to the accompanying drawing, 10 represents a portion of the housing of the transmission mechanism 11, which mechanism includes the friction band 12, having the bifurcated lugs projecting upwardly from its opposite ends, as shown at 13 and 14, respectively. The casing has the usual inwardly extending apertured boss 15, and the outwardly extending boss 16, which is in direct horizontal line with the first boss, and receives therethrough the pedal shaft or bolt 17. This bolt also passes through the near lug 13, of the band, and has on its outer end, just inwardly of, and bearing against its head 18, the hub of the pedal 19. The boss 16, and the hub of the pedal, are formed with the usual beveled or inclined coacting faces 20 and 21, whereby when the pedal is rocked on the shaft, the hub will engage with the head of the shaft and move the same longitudinally in a direction outward of the casing.

Disposed within the fork or bifurcation of the other lug 14, is an internally threaded nut 22, through which is threadedly engaged the end of the bolt or shaft 17. In the diametrically opposite sides of the nut 22 there are formed the grooves 23, which receive the legs of the bifurcation, so that the nut is positively held against rotation within the lug. The inner end face of the nut is formed with the radial grooves 24, for engagement by the toothed washer 25, held thereagainst by the spring 17' on the pedal shaft 17. The washer 25 has an internal tongue 26 which is received in the groove 27 of the bolt 17, whereby rotation of the washer, on the bolt, is prevented.

The cover of the transmission casing need not be removed, the adjustment of the bolt being accomplished by simply rotating the same with a wrench engaged with the head of the bolt, outwardly of the transmission casing.

What is claimed is:

1. The combination with the bifurcated lugs and pedal shaft of a transmission mechanism of an automobile, of a nut seated within one of the said lugs and formed for non-rotatable engagement with the lug, said nut receiving the said shaft therethrough, and means on the shaft and engaging with the nut for holding the shaft against rotation.

2. In a device for preventing rotation of the pedal shaft of the transmission mechanism, the combination with the bifurcated end of a transmission band and its pedal shaft, of a nut engaged on the end of the shaft and having opposite parallel grooves for the reception of the furcations of the end of the band, and a locking means on the shaft for engagement with one end face of the said nut.

3. The combination with the bifurcated end of a transmission band and the pedal shaft, of a nut disposed within the bifurcated band end and held against rotation thereby, said nut receiving the end of the pedal shaft therethrough, the inner end face of the nut having grooves, and a washer on the shaft having projections engaged in said grooves and held in such engagement by the spring of the pedal shaft.

4. The combination with the bifurcated end of a transmission band and the pedal shaft having a spring thereon, of a nut disposed within the bifurcated end and having opposite grooves receiving the furcation of said end to prevent rotation of the nut with relation to the furcations, the inner face of the nut having radial grooves, and a washer slidable on the pedal shaft and having radial ribs engaged in the grooves of the nut and maintained in such position by engagement of said spring.

In testimony whereof, I affix my signature, in the presence of two witnesses.

OSCAR E. SCHNOEBELEN.

Witnesses:
JOHN F. EAGLE,
MERTON E. SCHNOEBELEN.